United States Patent [19]

Cogley

[11] Patent Number: 4,808,779
[45] Date of Patent: Feb. 28, 1989

[54] SINGLE CYCLE, SINGLE FREQUENCY INDUCTION CONTOUR HARDENING PROCESS

[75] Inventor: Gary C. Cogley, Powell, Ohio

[73] Assignee: Industrial Electric Heating, Inc., Warren, Ohio

[21] Appl. No.: 178,582

[22] Filed: Apr. 7, 1988

[51] Int. Cl.$^4$ .............................................. H05B 6/14
[52] U.S. Cl. ............................ 219/10.43; 219/10.59; 148/147
[58] Field of Search ............... 219/10.59, 10.41, 10.43, 219/10.57; 148/147, 148, 150, 152; 29/159.2

[56] References Cited

U.S. PATENT DOCUMENTS

| | | | |
|---|---|---|---|
| 2,444,259 | 6/1948 | Jordan | 219/10.59 |
| 2,564,906 | 8/1951 | Kincaid et al. | 219/10.59 |
| 2,590,546 | 3/1952 | Kincaid et al. | 219/10.59 |
| 4,639,279 | 1/1987 | Chatterjee | 148/147 |
| 4,675,488 | 6/1987 | Mucha et al. | 219/10.43 |

Primary Examiner—Philip H. Leung
Attorney, Agent, or Firm—George Wolken, Jr.

[57] ABSTRACT

The present invention discloses a method for contour hardening a gear by means of induction heat treatment in a single heating cycle, using a single frequency of induction current. The typical frequency of alternating current is 50 KHz, applied in a single heating cycle for a duration in the general range of 0.3–1.0 seconds, having a power in the typical range of 200–1,000 KW. The power level required for any particular gear is typically 120% to 150% that required in the final heating step of a hardening process which requires preheating. An important advantage of the process disclosed herein is the elimination of the need to preheat the gear, yet contour harden tooth and root regions of said gear with a single heating cycle of a single frequency heating current.

5 Claims, 1 Drawing Sheet

SINGLE CYCLE, SINGLE FREQUENCY INDUCTION CONTOUR HARDENING PROCESS

BACKGROUND OF INVENTION

This invention relates to a method for the induction hardening of electrically and thermally conducting workpieces and more particularly to a method for the induction hardening of such electrically and thermally conducting workpieces substantially similar to a gear in shape. This method uses a single pulse of alternating current passed through the inductor surrounding the workpiece without the necessity for preheating the workpiece. This method uses only a single frequency of alternating current to accomplish contour hardening of the workpiece, including hardening of tooth and root regions of the workpiece, while avoiding through-tooth hardening with its attendant damage in gear performance.

In the manufacture of gears, it has been standard practice in the industry for several decades to harden the tooth and root regions of the gear to increase wear resistance and thereby to improve the performance and lifetime of the gear. The methods by which this hardening of the workpiece have been accomplished have evolved considerably over the years, reflecting the continuous need to increase processing speed, reliability and performance of the workpiece, while reducing manufacturing costs.

The conventional hardening method involves carburizing the outer surface of the gear, including the tooth and root regions, while typically shielding the remainder of the gear from carburization. In a typical process, the gear would be coated with a thin layer of copper over all regions except for the tooth and root regions intended to be carburized. Following copper coating, the entire gear would typically be heated in a furnace in a carburizing atmosphere, exposing the entire gear to the surrounding carburizing medium. The carburization would occur in the unplated tooth and root regions, while the copper coated portions of the gear would remain free from carburization. The copper coating would then be chemically removed in the final step of this carburizing process.

The carburization process as typically performed involves many processing steps. These naturally increase processing costs and reduce the number of gears which can be processed in a given amount of time. Also, the heating of the entire gear in a furnace typically induces significant distortion of the shape and dimensions of the gear. In many instances, these distortions are sufficient to cause the gear no longer to meet specifications, requiring subsequent machining to restore the gear to acceptable form. This machining step clearly adds to the time and cost of the finished gear. In addition, in order to bring the gear into its final shape, this machining process must be performed on the fully hardened gear. In many cases the machining of the hardened gear causes severe wear on the machining tools themselves, further adding to the manufacturing costs.

For many of the reasons described above, induction hardening was investigated as early as the 1940's as a method for case hardening gears in a more effective manner. Induction hardening involves passing alternating current through an inductor held in close proximity to the part to be hardened. The current-carrying inductor is surrounded by an alternating magnetic field which induces currents in the nearby electrically and thermally conducting workpiece (the gear in the present instance). The workpiece is thus heated by resistive heating caused by the induced currents. Regions of the workpiece too distant from the inductor will not be directly heated by induced currents. However, these regions may experience sufficient heating by means of thermal conduction from adjacent regions to produce the desired metallurgical properties.

The heating of the workpiece is affected by many factors, including: the frequency of the current, its magnitude and duration, the proximity of the coil to the workpiece, the configuration of the inductor coil, and the timing of heating and quenching, to name a few. However, the relative ease of heating by induction makes it a very attractive process in use today in many factories for the hardening of metals.

However, the hardening of gears by induction presents certain problems of its own. Typically, it is desired to harden both the tooth and the root regions of the gear. Therefore, both regions must be brought to a temperature exceeding the transfomation temperature. The penetration depth of induced currents in induction hardening process (hence the depth of heating, or case depth) varies inversely with the frequency of the alternating current. Thus, relatively low frequency current (typically 3-10 KHz) will heat effectively the root region of the gear, but not the tooth. Conversely, much higher frequency currents (typically 100-400 KHz, loosely called "radiofrequency" or "RF") heat the tooth of the gear quite efficiently, but such currents do not penetrate to heat the root region except by thermal conduction from the heated tooth. Much of the work on hardening of gears by induction heating has involved various methods to deal with the problems of case hardening both root and tooth regions as economically as possible.

One approach to this problem has been considered as early as 1950 in the report of J. A. Redmond ("Heat Treating Gears by Induction Heating", 34th Annual Meeting of the American Gear Manufacturers Association, June 1950). He notes in this report that 10 KHz induction heating can be used exclusively to harden gears if the heat treating is carried out to such an extent that the tooth region is heated by thermal conduction from the root. The 10 KHz induction current heats the root region most effectively by inducing currents completely encircling the circumference of the gear in the region of the root. If sufficient heat is generated for sufficient time, the tooth region of the gear will also be hardened by conduction heating from the induction-heated root region. However, as noted by Redmond, this technique has the drawback of heating the entire tooth of the gear completely through from one flank to the other. This causes the tooth to become more brittle and may break off from the gear when the gear is subjected to vigorous use. "Contour hardening" of just the surface regions of the tooth, root and flanks of the gear is desired to produce the desired resistance to wear without introducing structural brittleness into the gear.

One approach to the problem of contour hardening of gears without through-tooth hardening is to harden the gear one tooth at a time. Typically, an inductor coil is used having the approximate shape of the region between adjacent gear teeth and able to pass between adjacent teeth in close proximity to both. Such an inductor is commonly called an "intensifier". The intensifier is passed between adjacent gear teeth, hardening root and flanks as it does so. (Typically, such a method does not harden the very uppermost tip of the tooth, but this region is not often subject to serious wear and lack of hardening is not considered an important practical problem.) In operation, many gears are arranged in a stack such that a single pass of the intensifier heats a single root and flank region of many gears. Even so, the speed of the process is not favorable for high volume production and the part handling equipment tends to be complex.

Another approach to the effective contour hardening of gears has been a two-step process involving a preheating of the gear followed by a second heating step for the final hardening. Typically, two frequencies of induction current are used. A first preheating current is used (typically in the frequency range of 1 KHz to 10 KHz) which heats primarily the root region of the gear and, by thermal conduction, also heats the immediate surroundings. Following this preheating step (or sequence of steps), a final heating step is typically performed by means of a high frequency RF current to harden the tooth region. By means of this multistep process, the root and tooth regions can be heated to the proper temperature for the proper duration, without overheating the tooth region resulting in through-tooth hardening and brittleness.

This two-frequency process was described as early as 1950 in the reference by Redmond cited above and is still in active use. (As in the recent work by J. M. Storm and M. R. Chaplin, "Dual Frequency Induction Gear Hardening", American Gear Manufacturers Association, 1986). A recent patent to Mucha et. al. U.S. Pat. No. 4,675,488) describes a two-frequency process in which two preheating steps employing relatively low frequency current are used followed by a single final heating with RF current.

The dual frequency induction hardening of gears offers definite advantages over older methods in providing a relatively simple and rapid gear hardening process. However, certain problem remain. As illustrated in the Mucha patent, two separate induction heating coils are employed (typically, but not always, connected to two separate sources of alternating current). The gear to be hardened must be physically moved from one inductor coil to the other, increasing the complexity of the process and reducing speed. Also, as typified in the patent of Mucha, multiple heating steps may be required at each frequency (hence, in each inductor coil). This further complicates the problems of equipment and process control.

A very significant disadvantage of multistep induction heat treating processes is the possibility that later heating steps may reduce (or completely negate) the benefit done by previous steps in the gear manufacturing process. Typically, a gear is machined from unhardened steel and then subjected to a furnace heat treating operation to improve the toughness of the overall gear structure without introducing brittleness. Steel hardened by such "quench and temper" operations do not typically have the surface wear characteristics required of the final part. Multistep induction heat treating, intended to provide the desired wear characteristics, runs the risk of destroying wholly or partially the beneficial effects of the quench and temper.

Typically, a first heating step (or steps) in a multistep surface hardening procedure will be employed to preheat the root region of a gear. This is typically followed by a second heating step (or steps) for the purpose of hardening the tooth region while, at the same time, introducing sufficient additional heat into the root region to achieve hardening there also. However, the second heating step may add sufficient heat to the gear to temper back the previously achieved microstructure by thermal conduction. This results in a reduction of microhardness in a transitional manner from tooth to root.

All multistep heating processes run the risk of undoing by later heating any good done by prior heating. This possibility makes process control very important, further increasing processing costs. A major goal of the present invention is to use a single-step heating process to harden both tooth and root regions, thereby avoiding this potential problem In recognition of some of these problems, recent work by Chatterjee (U.S. Pat. No. 4,639,279) has eliminated the need for dual frequency heating. The process described by Chatterjee uses a single frequency (typically in the intermediate range of 50-100 KHz) for both preheating and final heating steps. This involves the use of only a single inductor coil and does not require the workpiece to be physically moved from place to place during the induction hardening process. This represents an important simplification of the induction hardening process for gears.

However, even with the recent developments of Chatterjee, certain problems remain which is the intent of the present invention to address. The Chatterjee invention is still a multistep heating process, although using a single frequency of induction heating current for each step. Thus, the problem still remains of controlling later steps sufficiently carefully to avoid undoing part or all of the benefits of earlier processing.

The developments of Chatterjee require a preheating phase at much lower power levels (but at the same frequency) as the final heating of the workpiece. This increases the time that the workpiece is exposed to heat over the rapid, single-step process disclosed in the present invention. Thus, the distortion of the workpiece is expected to be much lower for the present invention, reducing the need for later reshaping of the workpiece.

In addition, according to his disclosure, the invention of Chatterjee requires rather careful control of the rate at which the maximum power level is obtained (the "ramping"). It is an object of the present invention to describe an improved method for the induction hardening of gears in which no preheating is required, and precise control of the power ramping in this single heating step is likewise not required. It is submitted that these simplifications in the process represent important practical improvements in the art of induction contour hardening of gears.

SUMMARY AND OBJECTS OF INVENTION

The present invention relates to a method for induction hardening of gears in a single heating cycle (that is, without the need for preheating the gear) and using a single frequency of alternating current to perform the induction hardening. The present invention utilizes an intermediate frequency alternating current (typically 50 KHz) and power levels in a single heating cycle significantly higher that power levels used in the prior art (for example, the reference of Chatterjee). The use of intermediate frequency alternating current in combination with higher power levels (typically 20%-50% in excess of those taught by prior art references) allows tooth, flank, and root regions of the gear to be case hardened, without the need for several heating cycles, nor the need for dual frequency heating cycles, nor the need to carefully control the power ramping in the final heating cycle as taught by prior art.

A primary object of the present invention is to provide a method for induction contour hardening of gears in a single heating cycle using a single frequency of alternating current.

Another object of the present invention is to provide a method for the induction contour hardening of gears without the need to move the gear from place to place during the induction heating process.

Yet another object of the present invention is to provide a method for the induction contour hardening of gears without the need to carefully monitor and control the rate of power increase in the induction heating process.

Another object of the present invention is to provide a method for the induction contour hardening of gears in a single heating cycle with a single frequency of alternating current while avoiding through-tooth hardening of the workpiece.

Another object of the present invention is to provide a method for the induction contour hardening of gears with very little distortion of the workpiece, brought about by having a very short heating cycle for the workpiece.

Yet another object of the present invention is to provide a method for the induction contour hardening of gears, including root, flank and tooth hardening, without the need to individually scan between adjacent gear teeth.

DESCRIPTION OF PREFERRED EMBODIMENTS

Figure 1:
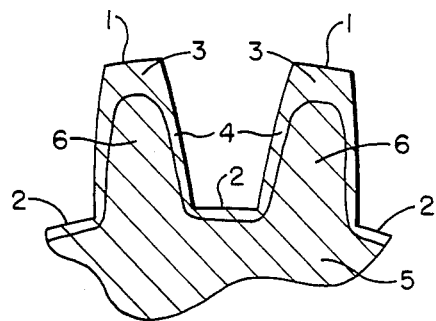
FIG. 1: A cross-sectional view of a segment of a typical case hardened gear showing tooth, flank and root regions as hardened by a contour hardening process.

FIG. 1 shows in cross-sectional view a portion of a typical gear, showing a pair of adjacent teeth, 1, having case hardened regions on the tooth, 2, on the root, 3, and on the flanks, 4. Of course, for the example presented here of a contoured hardened gear, the case hardened regions, 2, 3, and 4, lie on top of a region of unhardened gear material, 5, which comprises the majority of the mass of the gear. Thus, FIG. 1 shows a typical contour case hardening pattern as would be produced, for example, by the methods described herein. We note in particular that there is substantial unhardened material, 6, contained in the tooth region of the gear. As described previously, not all case hardening methods applied to gears achieve this general form of contour hardened pattern. Certain methods result in through-tooth hardening in which the tooth hardened regions 3 and 4 comprise the entire gear tooth. This hardened region is typically wear resistant, but is typically more brittle than the unhardened gear substrate, 5, leading to increased breakage at the base of the tooth and increased damage in use.

The method described herein is a typical method for achieving a contour case hardening pattern for gears as illustrated in general in FIG. 1. The methods described here are to illustrate the general method and are not intended to limit the scope of the method, or to exclude in any way extensions obvious to practitioners having ordinary skill in the art. In particular, the methods described herein are not limited to circular gears having outward-directed teeth. The methods are easily applied, with obvious modifications, to gears with teeth mounted at an angle, or having a spiral pattern with respect to the central axis of the gear. The methods are similarly applicable to gears having teeth mounted on the interior circumference thereof, rather than the more familiar gear structure shown in FIG. 2 with teeth mounted on the exterior circumference (needing only an interior-mounted inductor coil to practice the methods described herein). Other modifications to handle particular types of specialized gear designs will be obvious to the practitioner having ordinary skill in the art.

Figure 2:
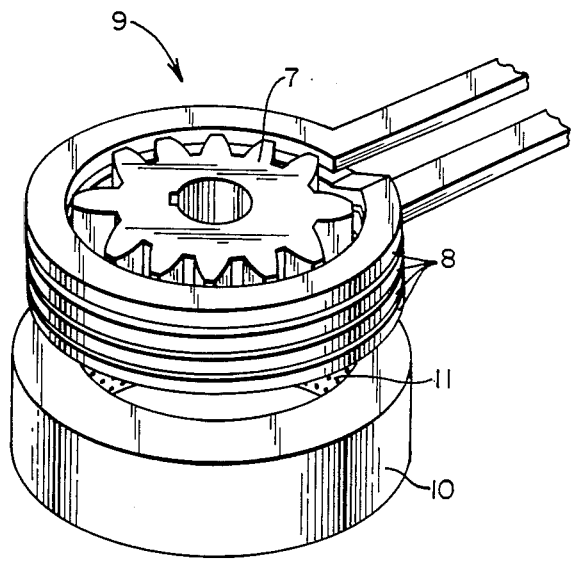
FIG. 2: Perspective view of a typical single cycle, single frequency induction hardening apparatus for case hardening a typical gear, including typical quenching facility.

FIG. 2 shows a schematic view of a typical gear hardening apparatus as would typically be employed in the practice of the present invention. In typical application, a gear, 7, would be mounted in close proximity to a typical inductor coil, 8 and coaxial therewith.

For gears having teeth on the interior circumference thereof, the inductor, 8 would also be in close proximity and concentric with said gear, but on the interior thereof, near the inwardly-projecting teeth. The design of the inductor coil for case hardening such gears by induction would be obvious to one with ordinary skill in the art.

Having mounted the typical gear, 7, in close proximity to the inductor coil, 8, and having a concentric central axis, 9, the gear is typically rotated about the common central axis, 9, at a reasonably high rate of rotation. The purpose of the rotation is to cause uniform heat treating around the entire circumference of the gear, despite slight nonuniformities in spacing to the inductor coil, 8, nonuniform induced currents, and other sources of nonuniform heating around the circumference of the gear. The rate of rotation must be sufficiently high to cause each point on the circumference of the gear receiving heat treatment to experience substantially the same average heating. Typically, a rotation rate sufficient to cause 34 complete rotations of the gear, 7, about its central rotation axis, 9, during the time of heat treatment will be sufficient. For a typical heat treating time of 0.8 sec., a rotation rate of 5 revolutions per second is a value typically found to be acceptable. Clearly, a more rapid rate of rotation will typically not harm the uniformity of heat treatment. Some variation in typical rotation rate is acceptable depending on the detailed mechanical design of the induction apparatus and the gear to be processed.

Once the gear, 7, has reached the desired rotation rate, alternating current is passed through inductor, 8, inducing heating currents in the gear, 7. Typically in the practice of the present invention, 50 KHz current is applied to the inductor, 8, for a period of time in the general range 0.3–1.0 sec. (0.5 sec is a typical time) at a high current level, typically in the general range 200–1,000 KW depending very much on the size of the gear, the size, pitch and depth of the teeth, and the depth of heat treatment required.

There are very many process variables that determine the desired amperage of alternating current to be carried by inductor, 8. These variables are typically determined experimentally for each type of gear before a process is set up for high-speed, high volume throughput. However, unlike multistep processes for heat treating gears disclosed by the prior art, the present method requires only a single heating cycle with typically 50 KHz current. But as a typical guideline, it is found in practice that this one-step power level must be rather larger than the power level used in the final heating step of a multistep process which includes preheating, such as disclosed by Chatterjee. The power level for the single step of the present process is typically in the general range of 120% to 150% of the power level typically required in the final heat treating step of the multistep process described by Chatterjee, to achieve comparable results to those of the Chatterjee process.

In contrast to the teachings of Chatterjee, the present invention has no particular requirements on the ramping of the power level to the maximum level. The power level should rapidly attain its maximum level, in a time typically small compared to the time at maximum power. But special control over the power ramping is not needed according to the present invention, so long as the power levels used are as described herein and exceed the power levels taught by the invention of Chatterjee.

Following heat treatment, it is common for the gear to require a liquid quench. FIG. 2 shows a typical method for applying this quench by means of a separate, hollow quench ring, 10 through which a suitable cooling fluid (typically water) circulates under pressure. Streams of cooling fluid are directed onto the surface of the workpiece, 7, typically be means of multiple nozzles, 11, located on the surface of the quench ring 10. The workpiece, 7, is rapidly lowered from the interior of the induction heating coil, 8, into the quench ring, 10, in a very short time, typically 0.5 second or less. Other methods for rapidly quenching the surface of a gear following heat treatment are well-known to practitioners of the art.

What is claimed is:

1. A process of contour hardening a gear by induction heat treatment, the process using a single frequency of induction current without preheating said gear, comprising the steps of:
   (a) mounting said gear on a rotatable spindle concentric with, and substantially surrounded by, the inductor coil of a high-frequency current generator;
   (b) rotating said gear in close proximity to said inductor coil, and concentric therewith, at a sufficiently rapid rate such that said gear completes at least three complete rotations in the period during which said inductor coil is supplied with current;
   (c) supplying said inductor coil with alternating current of predetermined frequency and current in a single pulse of current for a predetermined duration;
   (d) quenching said gear with cooling means providing thereby case hardening of said gear.

2. A process of contour hardening a gear as in claim 1 wherein said alternating current has a frequency of approximately 50 kilohertz.

3. A process of contour hardening a gear as in claim 2 wherein said alternating current has a value so as to produce a dissipation of electrical power in the range 200–1,000 kilowatts.

4. A process of contour hardening a gear as in claim 3, wherein said predetermined duration of said single pulse is in the range 0.3–1.0 seconds.

5. A process of contour hardening a gear as in claim 1, wherein said gear has teeth on the inner circumference thereof, and said inductor coil is in close proximity to, and concentric with said inner circumference.

* * * * *